United States Patent
Seok (10) Patent No.: US 11,401,111 B2
(45) Date of Patent: Aug. 2, 2022

(54) CONVEYOR APPARATUS AND OPERATING METHOD THEREOF

(71) Applicant: SK hynix Inc., Icheon-si (KR)

(72) Inventor: Dong Ju Seok, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 0 days.

(21) Appl. No.: 16/916,661

(22) Filed: Jun. 30, 2020

(65) Prior Publication Data

US 2021/0221621 A1 Jul. 22, 2021

(30) Foreign Application Priority Data

Jan. 21, 2020 (KR) .......................... 10-2020-0007827

(51) Int. Cl.
*B65G 21/06* (2006.01)
*B65G 43/10* (2006.01)

(52) U.S. Cl.
CPC ............. *B65G 21/06* (2013.01); *B65G 43/10* (2013.01); *B65G 2203/025* (2013.01); *B65G 2203/0233* (2013.01); *B65G 2207/30* (2013.01)

(58) Field of Classification Search
CPC .. B65G 21/06; B65G 43/10; B65G 220/0233; B65G 2207/30
USPC ........................................................ 198/583
See application file for complete search history.

(56) References Cited

U.S. PATENT DOCUMENTS

| | | | |
|---|---|---|---|
| 9,637,318 B2 * | 5/2017 | Messina | B65G 15/00 |
| 10,690,534 B2 * | 6/2020 | Ragan | G01G 19/035 |
| 11,052,811 B2 * | 7/2021 | Gaither | A61G 5/125 |
| 11,110,945 B2 * | 9/2021 | Bollapragada | B66C 13/48 |
| 2001/0008201 A1 | 7/2001 | Bonora et al. | |
| 2016/0167888 A1 | 6/2016 | Messina | |
| 2018/0164146 A1 | 6/2018 | Ragan | |
| 2020/0082338 A1 * | 3/2020 | Torita | B60M 7/00 |

FOREIGN PATENT DOCUMENTS

| | | |
|---|---|---|
| CN | 106241158 A | 12/2016 |
| CN | 107380910 A | 11/2017 |
| CN | 107848718 A | 3/2018 |

(Continued)

OTHER PUBLICATIONS

KR100960145B1202106111 Espacenet search proof, Jun. 11, 2021 (Year: 2021).*

*Primary Examiner* — Gene O Crawford
*Assistant Examiner* — Lester Rushin, III
(74) *Attorney, Agent, or Firm* — William Park & Associates Ltd.

(57) ABSTRACT

A conveyor apparatus includes a supporting plate and a conveyor module. The supporting plate is connected to the conveyor module. The supporting plate includes a first power and communication terminal that is configured to provide the conveyor module with power and a communication connection. The conveyor module is connected to the supporting plate. The conveyor module is detachable and includes a second power and communication terminal that is connected to the first power and communication terminal to receive the power and to perform the communication connection. The first and second power and communication terminals are detachable, with an ability to be connected to and disconnected from each other.

19 Claims, 10 Drawing Sheets

(56) References Cited

FOREIGN PATENT DOCUMENTS

| | | | |
|---|---|---|---|
| CN | 108469749 A | * | 8/2018 |
| CN | 110329715 A | | 10/2019 |
| JP | 2009215030 A | | 9/2009 |
| JP | 2018190207 A | | 11/2018 |
| KR | 100960145 B1 | | 5/2010 |
| KR | 101602145 B1 | | 3/2016 |
| TW | 430630 B1 | | 4/2001 |
| WO | 2011037289 A1 | | 3/2011 |

* cited by examiner

CONVEYOR APPARATUS AND OPERATING METHOD THEREOF

CROSS-REFERENCES TO RELATED APPLICATION

The present application claims priority under 35 U.S.C. § 119(a) to Korean application number 10-2020-0007827, filed on Jan. 21, 2020, in the Korean Intellectual Property Office, which is incorporated herein by reference in its entirety.

BACKGROUND

1. Technical Field

Various embodiments may generally relate to a conveyor apparatus and an operating method thereof.

2. Related Art

In order to manufacture a semiconductor device, a wafer may be transferred to various semiconductor fabrication apparatuses in unit processes.

A plurality of the wafers may be received in a cassette, such as a front opening unified pod (FOUP). The cassette may be sequentially transferred to the semiconductor fabrication processes by using a conveyor apparatus.

The conveyor apparatus may sequentially transfer a plurality of the cassettes in an unmanned work space based on a control program.

The cassette may be placed on a conveyor of the conveyor apparatus. It may be required to frequently exchange the conveyor with a new one due to a breakdown of the conveyor.

SUMMARY

In example embodiments of the present disclosure, a conveyor apparatus may include a supporting plate and a conveyor module. The supporting plate may be connected to the conveyor module, and the conveyor module may be detachable from the supporting plate. The supporting plate may include a first power and communication terminal. The conveyor module may include a second power and communication terminal connected to the first power and communication terminal to receive the power and to perform the communication connection. The first and second power and communication terminals are detachable, with an ability to be connected to and disconnected from each other.

In example embodiments of the present disclosure, according to a method of operating a conveyor apparatus, a position of a target conveyor module in a transfer path may be detected. A number of conveyor modules in a section in which the target conveyor module is positioned may be compared to an allowable number of the conveyor modules for the section to adjust the number of the conveyor modules in the section based on comparison results. Identification information of the section may be allotted and stored in the target conveyor module. Parameters for transferring an object may be set in the target conveyor module.

In example embodiments of the present disclosure, according to a method of operating a conveyor apparatus, transfer path conditions of an object may be set. When an entrance sensor of a first conveyor module detects the object, a timer to check an arrival time of the object at an exit of the first conveyor module may be driven. Whether or not an exit sensor of the first conveyor module may detect the object during a standby time may be checked. When the exit sensor of the first conveyor module detects the object during the standby time, a timer to check the arrival time of the object at an entrance of a second conveyor module may be driven. Whether or not an entrance sensor of the second conveyor module may detect the object during the standby time may be checked. When the entrance sensor of the second conveyor module detects the object during the standby time, whether or not transferring of the object may be completed may be checked. The transferring of the object may be finished or transferring of the object with respect to a next transfer path may be controlled based on checked results.

BRIEF DESCRIPTION OF THE DRAWINGS

The above and another aspects, features and advantages of the subject matter of the present disclosure will be more clearly understood from the following detailed description taken in conjunction with the accompanying drawings, in which.

DETAILED DESCRIPTION

Various embodiments of the present invention will be described in greater detail with reference to the accompanying drawings. The drawings are schematic illustrations of various embodiments (and intermediate structures). As such, variations from the configurations and shapes of the illustrations as a result, for example, of manufacturing techniques and/or tolerances, are to be expected. Thus, the described embodiments should not be construed as being limited to the particular configurations and shapes illustrated herein but may include deviations in configurations and shapes which do not depart from the spirit and scope of the present invention as defined in the appended claims.

The present invention is described herein with reference to cross-section and/or plan illustrations of idealized embodiments of the present invention. However, embodiments of the present invention should not be construed as limiting the inventive concept. Although a few embodiments of the present invention will be shown and described, it will be appreciated by those of ordinary skill in the art that changes may be made in these embodiments without departing from the principles and spirit of the present invention.

It will be understood that although the terms "first", "second", "third" etc. are used herein to describe various elements, these elements should not be limited by these terms. These terms are only used to distinguish one element from another element. Thus, a first element in some embodiments could be termed a second element in other embodiments without departing from the teachings of the present disclosure.

Further, it will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Example embodiments may provide a conveyor apparatus that may be capable of readily assembling and dissembling conveyors by arranging the conveyors by a module unit.

Example embodiments may also provide a method of operating the above-mentioned conveyor apparatus.

According to example embodiments, the conveyors may be constituted by modules. Thus, when a breakdown of the conveyor modules is generated, the conveyor may be exchanged with a new one by the modules.

Further, the conveyor module may be detachably connected to the supporting plate to provide the conveyor module with the power and the communication. Thus, the conveyor modules by unit may be readily exchanged.

Figure 1:
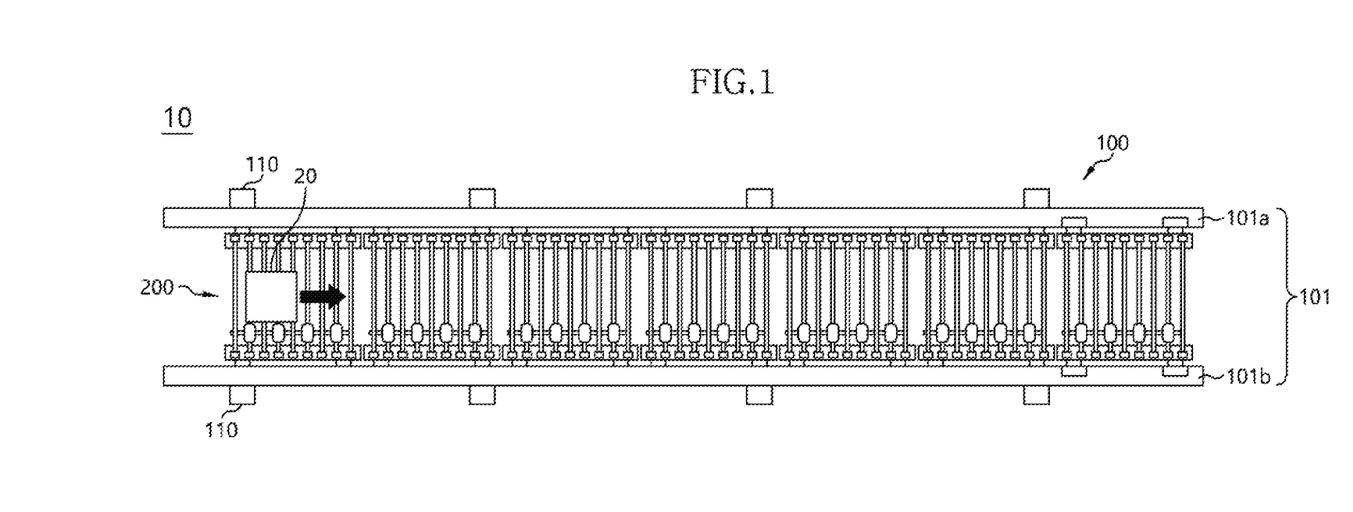
FIG. 1 is a view, illustrating a conveyor apparatus, in accordance with example embodiments.
Figure 2:
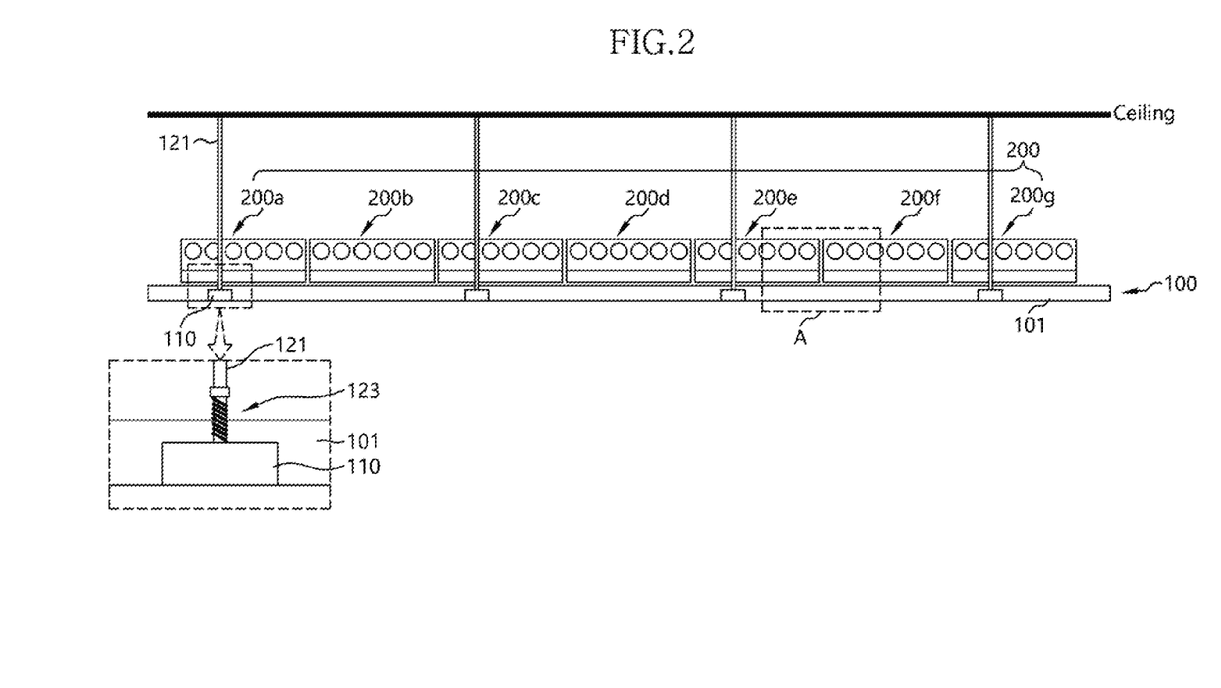
FIG. 2 is a view, illustrating a layout of a conveyor apparatus, in accordance with example embodiments.

FIG. 1 is a view, illustrating a conveyor apparatus, in accordance with example embodiments, and FIG. 2 is a view, illustrating a layout of a conveyor apparatus, in accordance with example embodiments.

Referring to FIG. 1, a conveyor apparatus 10 may include a supporting plate 100 and a conveyor module 200. The supporting plate 100 may include a plurality of supports 101a and 101b (hereinafter, indicated by 101) that are arranged to be spaced apart from each other by a uniform gap along a transfer path of an object 20. The conveyor module 200 may have both side portions that are connected to the supporting plate 100 to transfer the object 20 on the conveyor module 200 along the transfer path.

Referring to FIG. 2, the supporting plate 100 may be connected to a ceiling mount point 110 that is formed on the support 101. The supporting plate 100 that is connected to the ceiling mount point 110 may be mounted on a ceiling via a supporting bar 121.

The supporting plate 100 may include a threading member 123 that is arranged at a contact region between the supporting bar 121 and the support 101 to adjust a gap between the ceiling and the support 101 by tightening and releasing the threading member 123.

Alternatively, the supporting plate 100 may be connected to a floor without being restricted by connecting the supporting plate 100 with the ceiling as mentioned above.

As shown in FIG. 2, the conveyor module 200 may include independent unit modules 200a~200g. The conveyor modules 200 may be individually connected to the supporting plate 100. Thus, when a breakdown is generated at any one of the conveyor modules 200, only the broken conveyor module among the total conveyor modules 200 may be disassembled from the supporting plate 100. Thus, only the disassembled conveyor module may be exchanged with a new one. Further, identification information may be provided to each of the conveyor modules 200a~200g. Thus, the broken conveyor module 200 may be identified based on the identification information. The identification of the conveyor modules 200 may be illustrated in detail later.

Figure 4:
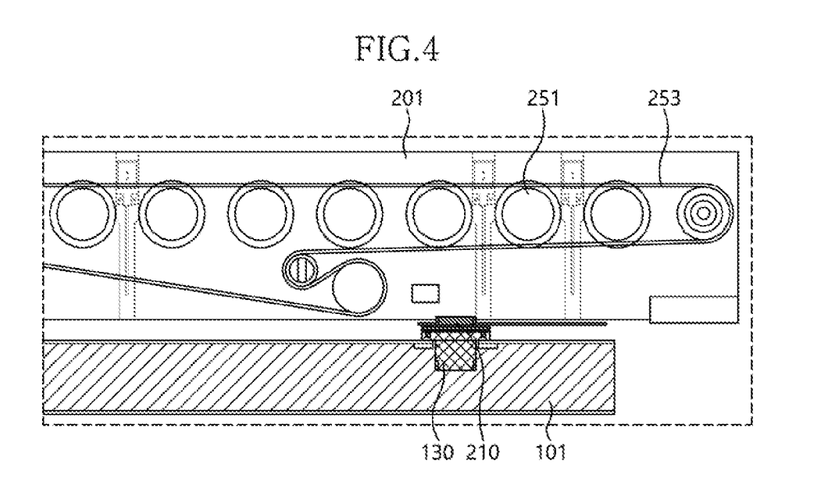
FIG. 4 is a view, illustrating a connection between a conveyor module and a supporting plate, in accordance with example embodiments.

Additionally, the conveyor module 200 may further include a plurality of rollers 251 in FIG. 4, a belt 253 in FIG. 4, and a motor. The rollers 251 may be serially arranged along the transfer path to transfer the object 20. The belt 253 may be configured to surround the rollers 251. The motor may be configured to drive the rollers 251.

Figure 3:
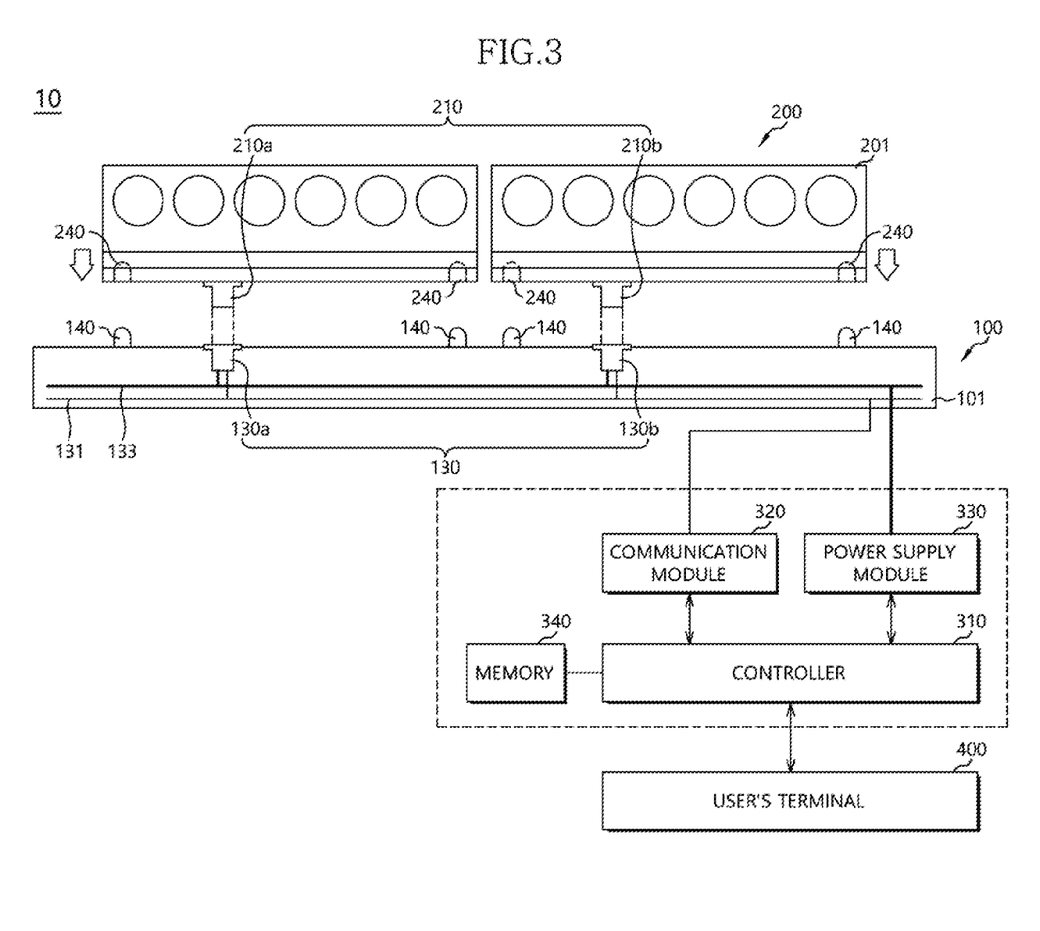
FIG. 3 is a view, illustrating a conveyor apparatus, in accordance with example embodiments.

FIG. 3 is a view, illustrating a conveyor apparatus, in accordance with example embodiments. FIG. 3 is an enlarged view of a portion "A" in FIG. 2.

Hereinafter, example embodiments may be illustrated with reference to FIG. 4 that shows a connection between a conveyor module and a supporting plate in accordance with example embodiments, FIGS. 5A and 5B that shows a method of exchanging a conveyor module in accordance with example embodiments, FIG. 6 that shows an entrance sensor and an exit sensor arranged at a conveyor module in accordance with example embodiments, and FIG. 7 that shows a transfer path of a conveyor module in accordance with example embodiments.

Referring to FIG. 3, the conveyor apparatus 10 may include the supporting plate 100, the conveyor module 200, a controller 310, a communication module 320, a power supply module 330 and a memory 340.

The supporting plate 100 may be arranged along the transfer path to support the conveyor module 200.

Particularly, the supporting plate 100 may be detachably combined with the conveyor module 200. The supporting plate 100 may include a first power and communication terminal 130 for providing the supporting plate 100 with a power and a communication connection.

When the conveyor module 200 is placed on the support 101, the first power and communication terminal 130 may have a detachable structure detachably coupled to a second power and communication terminal 210 of the conveyor module 200. Thus, the second power and communication terminal 210 may also have a detachable structure substantially equal or similar to the first power and communication terminal 130.

When the conveyor module 200 is placed on the support 101, the second power and communication terminal 210 may be inserted into the first power and communication terminal 130. Thus, shapes of the first and second power and communication terminals 130 and 210 may correspond to each other. For example, when the second power and communication terminal 210 has a convex shape, the first power and communication terminal 130 may have a concave shape configured to receive the convex shape. In contrast, when the second power and communication terminal 210 has a concave shape, the first power and communication terminal 130 may have a convex shape configured to be inserted into the concave shape.

As shown in FIG. 3, because a communication line 131 and a power line 133 may be arranged in the support 110 of the supporting plate 100, the first power and communication terminal 130 may have the detachable structure. The conveyor module 200 may also include a communication line and a power line connected to the second power and communication terminal 210.

The supporting plate 100 may include the support 101, a first fixing member 140 and mounts 121 and 123.

The support 101 may be arranged spaced apart from each other by a uniform gap along the transfer path to support the conveyor module 200.

The first fixing member 140 may be configured to fix the conveyor module 200 connected with the support 101. For example, the first fixing member 140 may have a convex shape or a concave shape.

Referring to FIG. 2, the mounts 121 and 123 may include the supporting bar 121 and the threading member 123. The supporting bar 121 may be configured to connect supporting bar 101 with the ceiling. The threading member 123 may be formed at the contact region between the supporting bar 121 and the support 101 to adjust the gap between the ceiling and the support 101 by tightening and releasing the threading member 123.

In example embodiments, the threading member 123 may include a bolt. Alternatively, the threading member 123 may include other members configured to connect and fix the support 101 to the supporting bar 121 or to adjust the gap between the ceiling and the support 101.

The conveyor module 200 may be configured to transfer the object 20 on the conveyor module 200 along the transfer path. The conveyor modules 200 may include the independent conveyor modules 200a~200g.

Each of the conveyor modules 200a~200g may have substantially the same size. Because the size of the conveyor modules 200a~200g may be same, any one of the conveyor modules 200a~200g may be readily exchanged with another.

When there are multiple conveyor modules 200, each of the conveyor modules 200a~200g may be combined with the supporting plate 100 with the ability to be detached. Thus, each of the conveyor modules 200a~200g may be detached from the supporting plate 100. Further, any one of the conveyor modules 200a~200g may be exchanged with a new conveyor module.

Figure 5A:
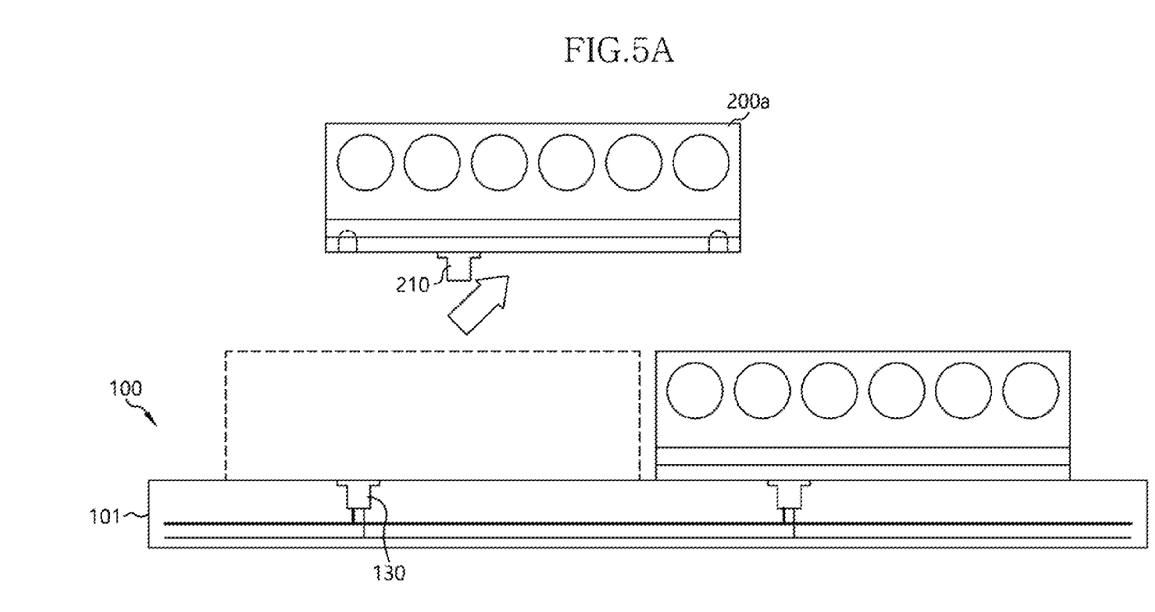
FIGS. 5A and 5B are views, illustrating a method of exchanging a conveyor module, in accordance with example embodiments.
Figure 5B:
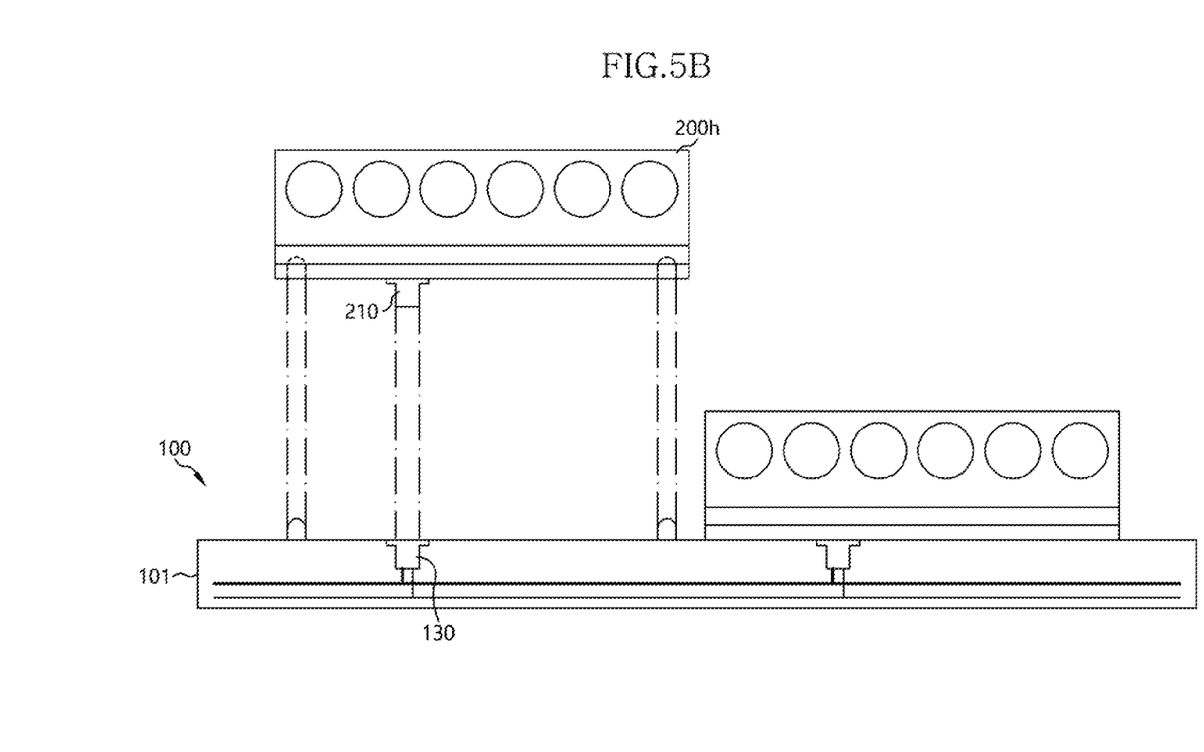

Particularly, referring to FIGS. 5A and 5B, the conveyor modules 200a~200g may be independently assembled with or detached from the supporting plate 100. Further, each of the conveyor modules 200a~200g may be exchanged with a new conveyor module.

Therefore, the conveyor module 200 may be connected to the supporting plate 100. Further, the conveyor module 200 may include the second power and communication terminal 210 that are selectively connected to the first power and communication terminal 130 to receive the power and to perform the communication connection.

Referring to FIG. 5B, the second power and communication terminal 210 may be electrically coupled to the first power and communication terminal 130 only by placing the conveyor module 200h on the support 101. In contrast, referring to FIG. 5A, the conveyor module 200a may be detached from the support 101 only by ascending the conveyor module 200.

That is, the first power and communication terminal 130 may be connected to or disconnected from the second power and communication terminal 210 by the detaching/attaching manner. Thus, when there is trouble at the conveyor module 200, the conveyor module 200 may be exchanged by the unit. Further, because the first power and communication terminal 130 may be readily disconnected from the second power and the communication terminal 210, the conveyor module 200 may be easily exchanged. Referring to FIGS. 5A and 5B, the conveyor module 200a may be disassembled from the support 101. The new conveyor module 200h may be mounted on a position where the conveyor module 200a may be placed.

The conveyor module 200 may further include a body 201 and a second fixing member 240.

The second fixing member 240 may be arranged at a position that corresponds to the first fixing member 140 to fix the supporting plate 100. The second fixing member 240 may have a convex shape or a concave shape based on the shapes of the first fixing member 140.

For example, when the first fixing member 140 has the concave shape, the second fixing member 240 may have a convex shape that is configured to be inserted into the concave first fixing member 140. In contrast, when the first fixing member 140 has the convex shape, the second fixing member 240 may have a concave shape that is configured to receive the convex first fixing member 140.

Additionally, the conveyor module 200 may further include a plurality of rollers 251 in FIG. 4, a belt 253 in FIG. 4, and a motor. The rollers 251 may be serially arranged along the transfer path to transfer the object 20. The belt 253 may be configured to surround the rollers 251. The motor may be configured to drive the rollers 251.

Figure 6:
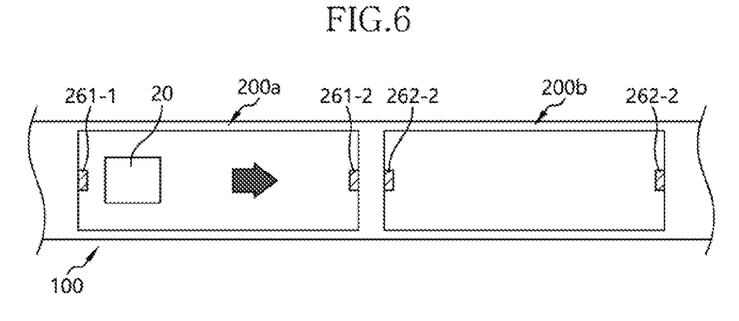
FIG. 6 is a view, illustrating an entrance sensor and an exit sensor arranged at a conveyor module, in accordance with example embodiments.

Referring to FIG. 6, the conveyor module 200 may include entrance sensors 261-1 and 262-1 to detect an entrance of the object 20, and exit sensors 261-2 and 262-2 to detect an exit of the object 20.

The entrance sensors 261-1 and 262-1 and the exit sensors 261-2 and 262-2 may be arranged at both ends of the conveyor module 200 on the transfer path. However, the positions of the entrance sensors 261-1 and 262-1 and the exit sensors 261-2 and 262-2 might not be limited to a specific position. That is, entrance sensors 261-1 and 262-1 and the exit sensors 261-2 and 262-2 may be placed at any positions to detect the entrance and the exit of the object 20.

Each of identification information may be provided to the entrance sensors 261-1 and 262-1 and the exit sensors 261-2 and 262-2. The identification information of the entrance sensors 261-1 and 262-1 and the exit sensors 261-2 and 262-2 may be utilized to detect the current position of the object 20, a troubled conveyor module 200, etc.

Further, the identification information of the entrance sensors 261-1 and 262-1 and the exit sensors 261-2 and 262-2 may be utilized as the identification information of the conveyor modules 200a~200a. However, independent identification information may be provided to the conveyor modules 200a~200g.

The controller 310 may be configured to control at least one of numbers of the conveyor module 200 per transfer sections (sections #1, #2, #3, #4, etc., in FIG. 7), the position of the conveyor module 200 based on the sections, a transfer speed, an acceleration, a deceleration, a stop position, a decelerated position, etc.

The controller 310 may be configured to match the identification information of the conveyor modules 200, the identification information of the section where the conveyor modules 200 may be arranged, and the arrangement order of the conveyor modules 200 in the section. The controller 310 may then store and manage the matched information in the memory 340.

The arrangement order of the conveyor modules 200 in the section may correspond to the identification information of the first power and communication terminal 130 to which the second power and communication terminal 210 of the conveyor module 200 may be coupled.

Referring to FIG. 3, the inherent identification information may be allotted to a plurality of the first power and communication terminals 130a, 130b, etc. Thus, when it is required to identify a specific conveyor module 200 due to a breakdown, the identification information of the first power and communication terminal 130 to which the second power and communication terminal 210 of the conveyor module 200 may be coupled may be utilized.

The controller 310 may recognize the current position and a transfer speed of the object 20 based on data of the object 20 obtained by the entrance sensors 261-1 and 262-1 and the exit sensors 261-2 and 262-2 of the conveyor modules 200. The controller 310 may control transfer speeds of a corresponding conveyor module 200a on which the object 20 may be placed and an adjacent conveyor module 200b to control the transfer speed of the object 20.

The controller 310 may recognize the section in the transfer path in which the object 20 may be positioned and the position of the conveyor module 200 on which the object 20 may be placed based on the identification information of the entrance sensors 261-1 and 262-1 and/or the exit sensors 261-2 and 262-2, which may detect the object 20.

The controller 310 may identify the conveyor module 200 based on the identification information of the entrance sensors 261-1 and 262-1 and/or the exit sensors 261-2 and 262-2 that detect the object 20. The controller 310 may recognize the position of the conveyor module 200 within the section on which the object 20 is placed based on the identification information of the first power and communication terminal 130 that is coupled to the conveyor module 200.

The communication module 320 may be electrically coupled to the communication line in the support 101 of the supporting plate 100 to provide the second power and communication terminal 210, which may be coupled to the first power and communication terminal 130, with the communication connection.

The power supply module 330 may be electrically connected to the power line in the support 101 of the supporting plate 100 to provide the second power and communication terminal 210, which may be coupled to the first power and communication terminal 130, with the power.

The communication module 320 and the power supply module 330 may be well known to a person skilled in the art. Thus, any further illustrations with respect to the communication module 320 and the power supply module 330 are omitted herein for the sake of brevity.

Figure 8:
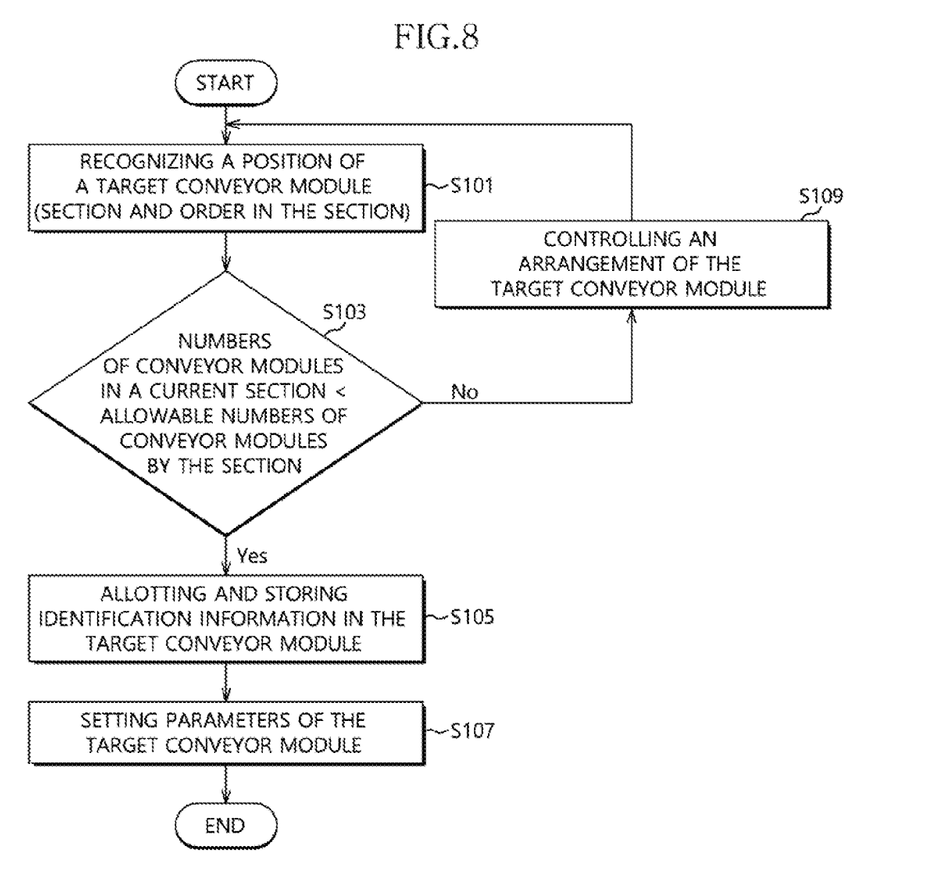
FIGS. 8 to 10 are flow charts, illustrating a method of operating a conveyor apparatus, in accordance with example embodiments.

FIG. 8 is a flow chart, illustrating a method of operating a conveyor apparatus, in accordance with example embodiments. FIG. 8 may show a method of initially setting parameters of the conveyor module.

Referring to FIG. 8, in step S101, the conveyor apparatus 10 may identify the position of the conveyor module 200 on the transfer path.

Particularly, the conveyor apparatus 10 may identify the position of the conveyor module 200 through the section in the transfer path where the conveyor module 200 may be placed and the order of the conveyor module 200.

For example, the conveyor apparatus 10 may identify the conveyor module 200 based on the identification information of the entrance sensor 261-1 and 262-1 or the exit sensors 261-2 and 262-2, which may detect the object 20. The conveyor apparatus 10 may recognize the position or the order of the conveyor module 200 in the section on which the object 20 may be place based on the first power and communication terminal 130 that is coupled to the conveyor module 200.

In steps S103 and S109, the conveyor apparatus 10 may compare the number of conveyor modules in a current section where the conveyor module 200 may be positioned with an allowable number of conveyor modules within the section. The conveyor apparatus 10 may then control the number of conveyor modules in the section in accordance with comparison results.

Figure 7:
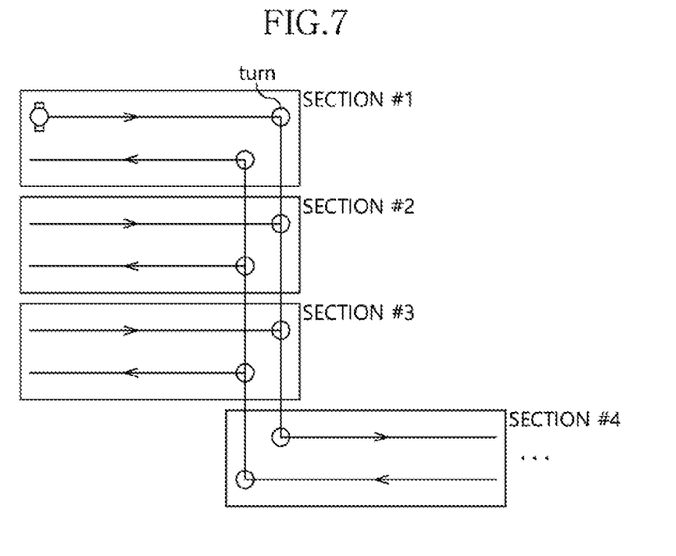
FIG. 7 is a view, illustrating a transfer path of a conveyor module, in accordance with example embodiments.

Referring to FIG. 7, the communicable number of conveyor modules 200 may be set in each of the sections #1, #2, #3, #4, etc., in FIG. 7 on the transfer path. The allowable number of conveyor modules within each section may correspond to the communicable number of conveyor modules 200. That is, the number of first power and communication terminals 130 within the section may correspond to the allowable number of conveyor modules within the section.

When the number of conveyor modules in the current section in which the conveyor module 200 is positioned is beyond the allowable number of conveyor modules within the section, in step S109, the conveyor apparatus 10 may transfer the conveyor module 200 to other sections to adjust the arrangement of the conveyor modules 200.

In step S105, the conveyor apparatus 10 may allot and store the identification information for the section in the conveyor module 200.

The identification information that is allotted to the conveyor module 200 may include the identification numbers of the corresponding section (for example, the sections #1, #2, #3, #4, etc., shown in FIG. 7) and the identification information to identify the position (order) of the conveyor module 200 in the section.

In step S107, the conveyor apparatus 10 may set parameters to transfer the object 20 in the conveyor module 200.

The conveyor apparatus 10 may set the parameters with at least one of a transfer speed, an acceleration, a deceleration, a stop position, and a decelerated position, through the conveyor module, based on the section in the transfer path in which the conveyor module 200 may be positioned.

It may be required to turn, move at a constant speed, accelerate, decelerate, or stop the conveyor module 200, based on positions in the section of the transfer path. Thus, the conveyor apparatus 10 may set the parameters corresponding to the various movement conditions.

Figure 9:
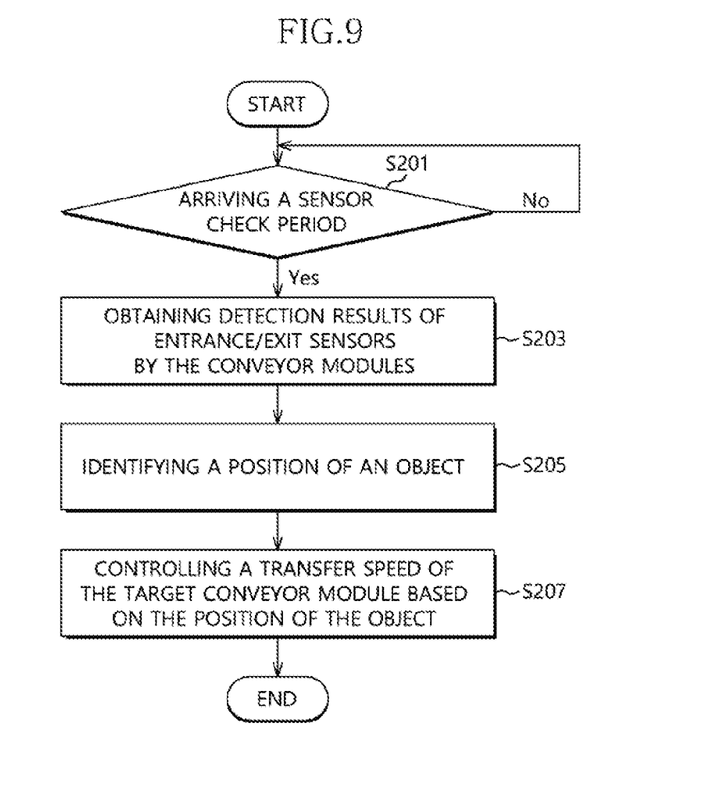

FIG. 9 is a flow chart, illustrating a method of operating a conveyor apparatus, in accordance with example embodiments. FIG. 9 may show a method of identifying the position of the object based on the entrance sensors and the exit sensors.

The position identification of the object may be performed after the parameters are set by the conveyor modules 200 in FIG. 8, not restricted within the above-mentioned sequence.

In steps S201 and S203, as a sensor check period arrives, the conveyor apparatus 10 may collect detection results of the object 20 from the entrance sensors 261-1 and 262-1 and the exit sensors 261-2 and 262-2 by a set period.

When there are multiple conveyor modules 200, each of the conveyor modules 200a~200g may include the entrance sensors 261-1 and 262-1 and the exit sensors 261-2 and 262-2. The inherent identification information may be allotted to the entrance sensors 261-1 and 262-1 and the exit sensors 261-2 and 262-2.

In step S205, the conveyor apparatus 10 may recognize the position of the object 20 based on the detection results of the object 20.

Particularly, the conveyor apparatus 10 may identify the section in the transfer path in which the object 20 may be positioned and the position of the conveyor module 200 on which the object 20 may be placed in the section based on the identification information of the entrance sensors 261-1 and 262-1 and the exit sensors 261-2 and 262-2, which may detect the object 20, to recognize the position of the object 20.

The conveyor apparatus 10 may identify the conveyor module 200 based on the identification information of the entrance sensors 261-1 and 262-1 and the exit sensors 261-2 and 262-2 that detect the object 20. The conveyor apparatus 10 may recognize the position of the conveyor module 200 within the section on which the object 20 is placed based on the identification information of the first power and communication terminal 130 that is coupled to the conveyor module 200.

In step S207, the conveyor apparatus 10 may control the transfer speed of the conveyor module 200 based on the position of the object 20.

Figure 10:
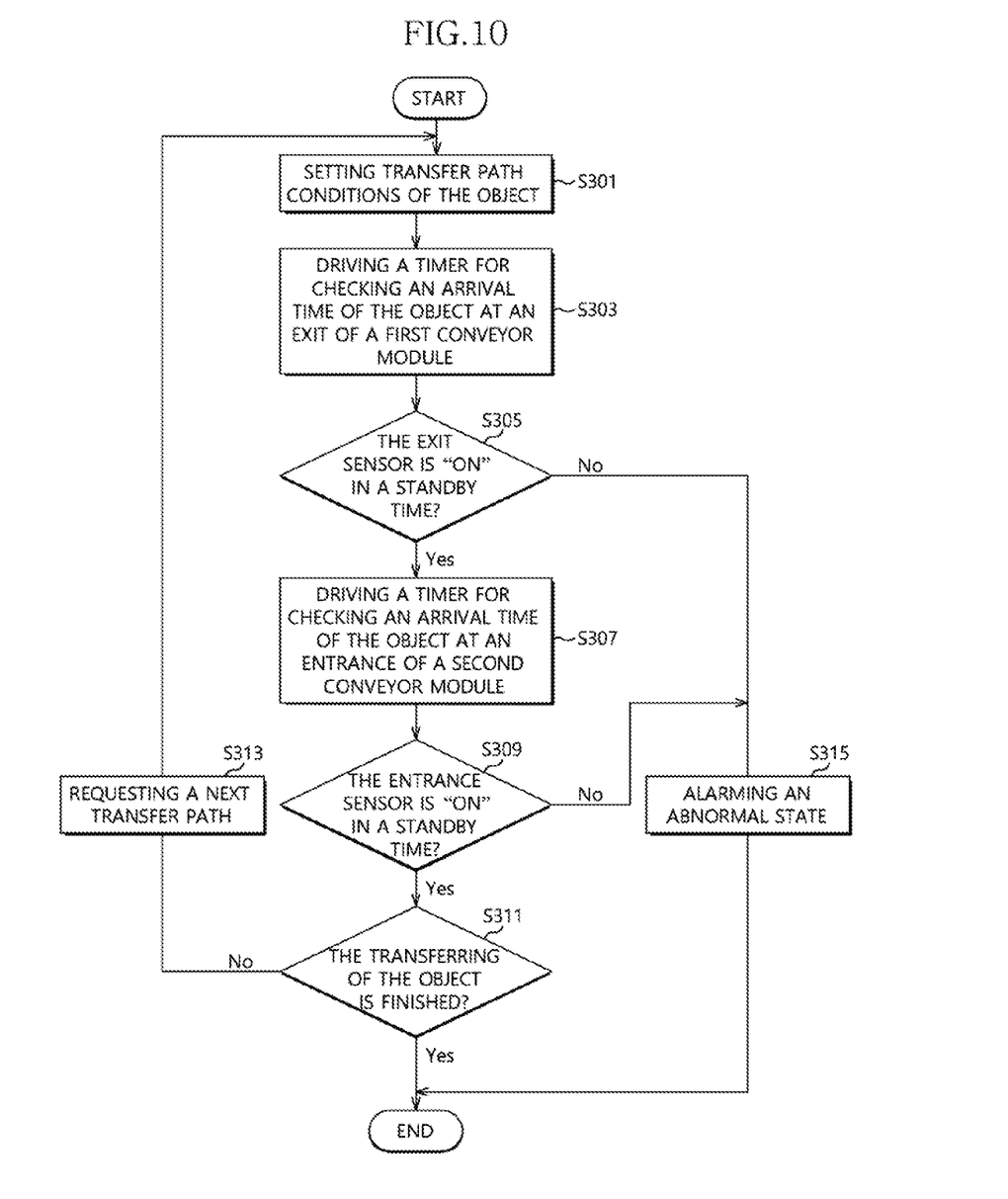

FIG. 10 is a flow chart, illustrating a method of operating a conveyor apparatus, in accordance with example embodiments. FIG. 10 may show a method of checking a transfer speed of the object.

Hereinafter, the method may be illustrated with reference to FIG. 6 for convenience.

In step S301, the conveyor apparatus 10 may set the transfer path conditions of the object 20.

For example, the conveyor apparatus 10 may set the transfer path conditions with at least one of movement directions, stops, destinations, and the transfer speed of the object 20.

In step S303, when the entrance sensor 261-1 of the first conveyor module 200a in FIG. 6 detects the object, the conveyor apparatus 10 may drive the timer to check an arrival time of the object 20 at the exit of the first conveyor module 200a. The exit may correspond to the position where the exit sensor 261-2 of the first conveyor module 200a may be located.

In step S305, the conveyor apparatus 10 may or might not identify whether the exit sensor 261-2 of the first conveyor module 200a detects the object 20 during a standby time.

The detection of the object 20 may be recognized by turning on the exit sensor 261-2.

When the exit sensor 261-2 of the first conveyor module 200a detects the object 20 during the standby time, in step S307, the conveyor apparatus 10 may drive the timer to check the arrival time of the object 20 at the entrance of the second conveyor module 200b.

In step S309, the conveyor apparatus 10 may identify whether or not the entrance sensor 262-1 of the second conveyor module 200b detects the object 20 during a standby time.

The steps S305 and S309 may check whether or not the object 20 arrives at the stop or a specific section to recognize whether or not the object 20 is transferred at a normal speed.

When the entrance sensor 262-1 of the second conveyor module 200b detects the object 20 during the standby time, in step S311, the conveyor apparatus 10 may identify whether or not the transferring of the object 20 is completed.

In contrast, when the exit sensor 261-2 of the first conveyor module 200a does not detect the object 20 during the standby time in step S305, in step S315, the conveyor apparatus 10 may output an abnormal notice or transmit an abnormal notice message to a user's terminal 400 in FIG. 3. When the object 20 does not arrive at the specific position during the standby time, the conveyor apparatus 10 may determine the non-transferring of the object 20 to be due to the trouble of the first conveyor module 200a. The abnormal notice message may include a text, an image, a voice or a combination thereof.

When the entrance sensor 262-1 of the second conveyor module 200b does not detect the object 20 during the standby time in step S305, in step S315, the conveyor apparatus 10 may output an abnormal notice or transmit an abnormal notice message to a user's terminal 400 in FIG. 3.

The above described embodiments of the present invention are intended to illustrate and not to limit the present invention. Various alternatives and equivalents are possible. The invention is not limited by the embodiments described herein. Nor is the invention limited to any specific type of semiconductor device. Another additions, subtractions, or modifications are obvious in view of the present disclosure and are intended to fall within the scope of the appended claims.

What is claimed is:

1. A conveyor apparatus comprising:
 a supporting plate including a first power and communication terminal; and
 a conveyor module connected to the supporting plate, the conveyor module with a second power and communication terminal connected to the first power and communication terminal to receive power and to perform a communication connection,
 wherein the conveyor module is fixedly connected to the supporting plate to transport an object while having the capability of being detached from the supporting plate, and
 wherein the first and second power and communication terminals are detachable, with an ability to be connected to and disconnected from each other.

2. The conveyor apparatus of claim 1, wherein the supporting plate comprises:
 supports spaced apart from each other along a transfer path; and
 a first fixing member configured to fix the conveyor module to the supports,
 wherein the first fixing member having a convex or a concave shape.

3. The conveyor apparatus of claim 2, wherein the conveyor module comprises:
 a body; and
 a second fixing member arranged at a position that corresponds to the first fixing member to fix the conveyor module to the supporting plate, the second fixing member with a convex or a concave shape, corresponding to the convex or the concave shape of the first fixing member.

4. The conveyor apparatus of claim 2, wherein the supporting plate further comprises:
 a supporting bar connecting the supports to a ceiling; and
 a threading member arranged at a contact region between the supporting bar and the supports to adjust a gap between the ceiling and the supports by tightening and releasing the threading member.

5. The conveyor apparatus of claim 1, wherein the conveyor module comprises a plurality of conveyor unit modules, and
 wherein the conveyor unit modules have substantially the same size.

6. The conveyor apparatus of claim 1, wherein the conveyor module comprises a plurality of conveyor unit modules,
 wherein each of the conveyor unit modules is connected to the supporting plate,
 wherein each of the conveyor unit modules is independently disassembled from the supporting plate to be exchanged with a new conveyor module, and
 wherein each of the conveyor unit modules is detachable.

7. The conveyor apparatus of claim 1, wherein the conveyor module further comprises an entrance sensor configured to detect an entrance of an object and an exit sensor configured to detect an exit of the object.

8. The conveyor apparatus of claim 7, further comprising a controller configured to control at least one of numbers of the conveyor module per a transfer section, a position of the conveyor module in the section, a transfer speed of the conveyor module, an acceleration of the conveyor module, a deceleration of the conveyor module, a stop position of the conveyor module, and a decelerated position of the conveyor module.

9. The conveyor apparatus of claim 8, wherein the controller matches identification information of the conveyor module, identification information of the section where the conveyor module is positioned, and an arrangement order of the conveyor module in the section, and wherein the controller stores and manages the matched information in a memory.

10. The conveyor apparatus of claim 9, wherein the arrangement order of the conveyor module in the section comprises identification information of the first power and communication terminal that is coupled to the second power and communication terminal of the conveyor module.

11. The conveyor apparatus of claim 8, wherein the controller recognizes a current position and a transfer speed of the object based on detecting the object through the entrance sensor and the exit sensor of the conveyor module, and wherein the controller controls transfer speeds of a corresponding conveyor module on which the object is placed and an adjacent conveyor module to control the transfer speed of the object.

12. The conveyor apparatus of claim 11, wherein the controller recognizes a section in a transfer path where the object is placed and a position of the conveyor module in the section on which the object is placed based on identification information of the entrance sensor or the exit sensor that detects the object to obtain the position of the object.

13. A method of operating a conveyor apparatus including supporting plate formed along a transfer path and a plurality of conveyor module configured to be fixedly connected to the supporting plate to transport an object while having the capability of being detached from the sup or ting plate, the method comprising:

recognizing a position of a target conveyor module in the transfer path;

comparing a number of conveyor modules in a section in which the target conveyor module is positioned to an allowable number of the conveyor modules for the section to adjust the number of the conveyor modules in the section based on comparison results;

allotting and storing identification information of the section in the target conveyor module; and setting a parameter, for transferring an object, in the target conveyor module.

14. The method of claim 13, wherein setting the parameters comprises setting the parameters with at least one of a transfer speed of the conveyor module, an acceleration of the conveyor module, a deceleration of the conveyor module, a stop position of the conveyor module and a decelerated position of the conveyor module based on the section in the transfer path in which the target conveyor module is positioned.

15. The method of claim 13, wherein the conveyor module comprises a plurality of the conveyor unit modules, and each of the conveyor unit modules comprises an entrance sensor and an exit sensor, the method further comprising after setting the parameters:

collecting detection results of the object from the entrance sensor and the exit sensor within a period;

recognizing a position of the object based on the detection results of the object; and controlling a transfer speed of the target conveyor module based on the position of the object.

16. The method of claim 15, wherein recognizing the position of the object comprises recognizing a section in a transfer path where the object is placed and a position of the target conveyor module in the section on which the object is placed based on identification information of the entrance sensor or the exit sensor that detects the object to obtain the position of the object.

17. A method of operating a conveyor apparatus including supporting plate formed along a transfer path and a plurality of conveyor module configured to be fixedly connected to the supporting plate to transport an object while having the capability of being detached from the supporting plate, the method comprising:

setting transfer path conditions of an object;

driving a timer to check an arrival time of the object at an exit of a first conveyor module when an entrance sensor of the first conveyor module detects the object;

identifying whether or not an exit sensor of the first conveyor module detects the object during a standby time;

driving a timer to check the arrival time of the object at an entrance of a second conveyor module when the exit sensor of the first conveyor module detects the object during the standby time;

identifying whether or not an entrance sensor of the second conveyor module detects the object during the standby time;

identifying whether or not transferring of the object is completed when the entrance sensor of the second conveyor module detects the object during the standby time; and finishing the transferring of the object or controlling a next transfer path based on identification results.

18. The method of claim 17, after identifying the detection of the object by the exit sensor of the first conveyor module, further comprising outputting an abnormal notice or transmitting an abnormal notice message to a user's terminal when the exit sensor of the first conveyor module fails to detect the object during the standby time.

19. The method of claim 17, after identifying the detection of the object by the entrance sensor of the second conveyor module, further comprising outputting an abnormal notice or transmitting an abnormal notice message to a user's terminal when the entrance sensor of the second conveyor module fails to detect the object during the standby time.

* * * * *